(12) United States Patent
Stevens, Jr.

(10) Patent No.: US 9,574,354 B2
(45) Date of Patent: Feb. 21, 2017

(54) INTERLOCKING PANEL

(71) Applicant: PERGO (EUROPE) AB, Trelleborg (SE)

(72) Inventor: Charles Edward Stevens, Jr., Dudley, NC (US)

(73) Assignee: PERGO (EUROPE) AB, Trelleborg (SE)

( * ) Notice: Subject to any disclaimer, the term of this patent is extended or adjusted under 35 U.S.C. 154(b) by 0 days.

(21) Appl. No.: 14/633,923

(22) Filed: Feb. 27, 2015

(65) Prior Publication Data
US 2015/0240500 A1 Aug. 27, 2015

Related U.S. Application Data

(63) Continuation of application No. PCT/IB2013/058022, filed on Aug. 27, 2013.

(60) Provisional application No. 61/693,668, filed on Aug. 27, 2012.

(51) Int. Cl.
*E04F 15/02* (2006.01)
*E04F 15/10* (2006.01)
*E04F 15/04* (2006.01)
*F16B 5/00* (2006.01)

(52) U.S. Cl.
CPC ....... *E04F 15/02038* (2013.01); *E04F 15/045* (2013.01); *E04F 15/107* (2013.01); *E04F 2201/0138* (2013.01); *E04F 2201/0146* (2013.01); *E04F 2201/023* (2013.01); *E04F 2201/03* (2013.01); *E04F 2201/043* (2013.01); *F16B 5/0056* (2013.01)

(58) Field of Classification Search
None
See application file for complete search history.

(56) References Cited

U.S. PATENT DOCUMENTS

| | | | |
|---|---|---|---|
| 5,630,304 A * | 5/1997 | Austin | 52/384 |
| 6,216,409 B1 * | 4/2001 | Roy et al. | 52/589.1 |
| 6,332,733 B1 * | 12/2001 | Hamberger et al. | 403/329 |
| 6,345,481 B1 * | 2/2002 | Nelson | E04F 15/02 |
| | | | 52/592.2 |
| 6,536,178 B1 * | 3/2003 | Pålsson | B44C 3/123 |
| | | | 52/392 |
| 6,922,965 B2 * | 8/2005 | Rosenthal et al. | 52/592.1 |
| 7,251,916 B2 * | 8/2007 | Konzelmann et al. | 52/592.1 |

(Continued)

FOREIGN PATENT DOCUMENTS

| | | |
|---|---|---|
| DE | 103 05 695 A1 | 9/2004 |
| EP | 2 009 197 A1 | 12/2008 |

(Continued)

OTHER PUBLICATIONS

International Search Report with Written Opinion for Application No. PCT/IB2013/058022 dated Jan. 17, 2014.

*Primary Examiner* — Rodney Mintz
(74) *Attorney, Agent, or Firm* — Jenkins, Wilson, Taylor & Hunt, P.A.

(57) ABSTRACT

A panel, which, at two opposite edges, is provided with coupling parts that allow joining by a downward movement, said coupling parts including a male part that fits in a female part, wherein vertically active locking portions are provided at opposite sides of the male part and female part, wherein these locking portions are located at different distances from an upper side of the panels.

19 Claims, 3 Drawing Sheets

(56) References Cited

U.S. PATENT DOCUMENTS

| | | | |
|---|---|---|---|
| 7,484,337 B2* | 2/2009 | Hecht | 52/578 |
| 7,506,481 B2* | 3/2009 | Grafenauer | 52/592.1 |
| 7,516,588 B2* | 4/2009 | Pervan | B27F 5/026 |
| | | | 52/591.1 |
| 7,874,118 B2* | 1/2011 | Schitter | 52/578 |
| 7,975,451 B2* | 7/2011 | Leopolder et al. | 52/586.1 |
| 8,001,741 B2* | 8/2011 | Duernberger | 52/591.1 |
| 8,191,328 B1* | 6/2012 | Liu | 52/588.1 |
| 8,607,532 B2* | 12/2013 | Permesang | 52/796.1 |
| 2002/0178681 A1* | 12/2002 | Zancai et al. | 52/592.1 |
| 2003/0101674 A1* | 6/2003 | Pervan | E04C 2/20 |
| | | | 52/592.1 |
| 2004/0211144 A1* | 10/2004 | Stanchfield | 52/578 |
| 2005/0204676 A1* | 9/2005 | Weitzer | 52/578 |
| 2005/0247000 A1* | 11/2005 | Zhu | 52/588.1 |
| 2006/0179773 A1* | 8/2006 | Pervan | 52/592.1 |
| 2007/0130872 A1* | 6/2007 | Goodwin et al. | 52/592.1 |
| 2008/0000185 A1* | 1/2008 | Duernberger | E04F 15/02 |
| | | | 52/578 |
| 2008/0000188 A1* | 1/2008 | Pervan | 52/588.1 |
| 2008/0307739 A1* | 12/2008 | Clucas | 52/580 |
| 2009/0223162 A1* | 9/2009 | Chen et al. | 52/588.1 |
| 2009/0249733 A1* | 10/2009 | Moebus | 52/588.1 |
| 2010/0031594 A1 | 2/2010 | Liu et al. | |
| 2010/0037550 A1* | 2/2010 | Braun | 52/588.1 |
| 2010/0218450 A1* | 9/2010 | Braun et al. | 52/588.1 |
| 2011/0094178 A1* | 4/2011 | Braun | 52/588.1 |
| 2011/0131909 A1* | 6/2011 | Hannig | 52/309.1 |
| 2011/0167744 A1* | 7/2011 | Whispell | E04F 15/02 |
| | | | 52/309.1 |
| 2011/0258959 A1* | 10/2011 | Braun | 52/588.1 |
| 2012/0066996 A1* | 3/2012 | Konstanczak | E04F 13/08 |
| | | | 52/588.1 |
| 2012/0174521 A1* | 7/2012 | Schulte | 52/588.1 |
| 2013/0008118 A1* | 1/2013 | Baert et al. | 52/588.1 |
| 2013/0042563 A1* | 2/2013 | Pervan et al. | 52/582.2 |
| 2013/0180193 A1* | 7/2013 | Bossuyt | 52/309.13 |
| 2013/0247502 A1* | 9/2013 | Zhang | 52/588.1 |
| 2014/0033633 A1* | 2/2014 | Kell | 52/588.1 |
| 2014/0215946 A1* | 8/2014 | Roy et al. | 52/309.1 |
| 2014/0325930 A1* | 11/2014 | Schneider | 52/588.1 |

FOREIGN PATENT DOCUMENTS

| | | |
|---|---|---|
| WO | WO 2005 088029 A1 | 9/2005 |
| WO | WO 2007 141605 A2 | 12/2007 |
| WO | WO 2009 066153 A2 | 5/2009 |
| WO | WO 2012 126046 A1 | 9/2012 |

* cited by examiner

INTERLOCKING PANEL

CROSS-REFERENCE TO RELATED APPLICATIONS

This application is a continuation of and claims priority to PCT patent application Ser. No. PCT/IB2013/058022 filed Aug. 27, 2013, which claims the benefit of and priority to U.S. Provisional Patent Application No. 61/693,668, filed Aug. 27, 2012, the entire disclosures of which are incorporated by reference herein.

BACKGROUND

1. Technical Field

The present invention relates to a panel. In first instance, it relates to a floor panel, however, more generally, the invention can also be applied in other types of panels, for example, panels for a wall covering or ceiling.

More specifically, the invention relates to panels which on their edges can be coupled to each other and interlocked.

In particular, the invention relates to a panel of the type having an upper surface, a lower surface and at least one pair of opposite edges;
wherein said pair of edges comprises a first edge having a first joint profile and a second edge having a second joint profile;
wherein said joint profiles define coupling parts allowing that two of such panels can be joined, or are joinable, by a downward movement of the edge of one panel in respect to the edge of the other panel, wherein said coupling parts in a coupled condition provide a locking in a direction perpendicular to the plane of the coupled panels, as well as in a direction parallel to the plane of the coupled panels and perpendicular to the respective edges;
wherein the first joint profile comprises a first laterally projecting lip with a downward projecting locking part, said downward projecting locking part defining a male part;
wherein the second joint profile comprises a second laterally projecting lip with an upward projecting locking part, said upward projecting locking part defining proximally thereof a recess acting as a female part;
wherein the first laterally projecting lip with the downward projecting locking part defines a downward directed hook, whereas the second laterally projecting lip with the upward projecting locking part defines an upward directed hook;
wherein, in the coupled condition of two of such panels, the downward directed hook and upward directed hook engage behind each other so as to prevent drifting apart of the panels;
wherein said coupling parts further comprise vertically active locking portions which at least define a first point of contact and a second point of contact, said points of contact being located at opposite sides of said male and female parts;
wherein said vertically active locking portions comprise a first locking portion and a second locking portion at the respective opposite sides of said male part and a third locking portion and a fourth locking portion at the respective opposite sides of the female part;
wherein said first and third locking portions in the coupled condition of two of such panels define said first point of contact and have contact surfaces that in the coupled condition of two of such panels define an inclined tangent line;
wherein said second and fourth locking portions in the coupled condition of two of such panels define said second point of contact and have contact surfaces that in the coupled condition of two of such panels define an inclined tangent line;
wherein said male part has a distal side and a proximal side, said second locking portion being located at the distal side;
wherein the panel at said first edge has a distal edge defining the closing plane of the panels, said second locking portion being located in an inwardly offset position in regard to said distal edge; and
wherein said joint profiles are in one piece from the panel material; and
wherein measured according to a direction perpendicular to the plane defined by the panels, the second point of contact is closer to the plane defined by the upper surface of the panels than the first point of contact.

2. Related Art

Panels of this type are known from document DE 103 05 695 A1. An aim of the present invention is to improve the panels of this type and in particular to improve the coupling parts thereof. In particular, it is envisaged to obtain a coupling which, on the one hand, allows an easy joining by a downward movement of one panel in respect to the other, but, on the other hand, also offers a reliable coupling, which, amongst others, after a period of time will not obtain the tendency of getting released.

SUMMARY

To this end, the present invention relates to a panel of the above-mentioned type, said panel being characterized in that it further comprises or shows at least one feature or a combination of any two or any three features or a combination of all features, selected from the following four features:
 measured according to a direction perpendicular to the plane of two of such coupled panels the distance between the first point of contact and the second point of contact is larger than 0.10 times the overall thickness of the panel;
 the second point of contact is located higher than the upper edge of said upward projecting locking part;
 the distance between the first and the second points of contact measured parallel to the plane of the panels and perpendicular to the respective edges is smaller than 4 times, and better smaller than 3 times the vertical distance between the first and second points of contact;
 the co-operation at the second point of contact occurs by co-operating flat but inclined surfaces at the respective locking portions, whereas the co-operation at the second point of contact occurs by two co-operating surfaces of which at least one of them is and preferably both of them are curved.

In other words, according to the present invention, the above four features can be applied each separately or in any possible combination.

Each of the first three features, in combination with the fact that the second point of contact is located at a higher position than the first point of contact, offers the advantage that any tendency according to which the downward projecting locking part might leave the female part, in particular due to a slight rotation, is counteracted. The fourth feature allows a smooth joining by the curved surfaces, whereas by the flat but inclined surfaces simultaneously a reliable locking is guaranteed.

According to a preferred embodiment, the panel is characterized in that measured according to a direction perpendicular to the plane of two of such coupled panels the distance between the first point of contact and the second point of contact is larger than 0.15 times the overall thickness of the panel.

According to another preferred feature, the panel is characterized in that the lowermost contact at the second point of contact is located higher than the uppermost contact at the first point of contact.

According to still another preferred feature, the panel is characterized in that the lowermost contact at the second point of contact is located higher than the uppermost contact at the first point of contact over a distance of at least 0.10 and still better at least 0.15 times the overall thickness of the panel.

According to still another preferred feature, the panel is characterized in that the second point of contact is located higher than the level that generally is defined by the lower side of said first laterally projecting lip. As a result a better resistance is offered against tearing off of material parts, such as the tearing off of locking portions.

According to still another preferred feature, the panel is characterized in that it has a first pair of opposite edges and a second pair of opposite edges, said first and second joint profiles being provided at the second pair of opposite edges; in that the panel at the first pair of opposite edges comprises coupling parts that in the coupled condition of two of such panels provide a locking in a direction perpendicular to the plane of the coupled panels, as well as in a direction parallel to the plane of the coupled panels and perpendicular to the respective edges; and in that said coupling parts at the first pair of sides are configured such that they allow that two of such panels can be joined or are joinable by an angling movement of one panel in respect to the other, thereby allowing the joining of a plurality of such panels by the so-called fold-down technique.

According to still another preferred feature, the panel is characterized in that, seen in cross section, said first joint profile comprises only one vertically active locking portion at each side of said male part. This assists in a smooth joining.

According to still another preferred feature, the panel is characterized in that said first joint profile above the second locking portion comprises a laterally protruding lip, said lip comprising at its lower side a downward facing support surface, that in coupled condition is intended to co-operate with an upward directed support surface at the second joint profile of a coupled panel, thereby forming a third contact point. In a still further preferred embodiment hereof, the panel is also characterized in that in the coupled condition there are only four points of contact between the first joint profile and the second joint profile, namely the aforementioned first, second and third points of contact and a fourth point of contact at the distal end of said laterally protruding lip.

In the most preferred embodiment, the downward projecting locking part of the first joint profile is a solid part, at least in between the first and second points of contact. This offers the advantage that a stable material part is present between the points of contact, resulting in that no unwanted compression may occur.

Further, it is preferred that the aforementioned locking portions, which provide in a locking vertical to the plane of the panels, are configured such that one or more of the following features are obtained:

the cooperation at the second point of contact occurs by cooperating flat but inclined surfaces at the respective locking portions;

the cooperation at the first point of contact occurs by two cooperating surfaces of which at least one of them is and preferably both of them are curved;

the cooperation at the first point of contact occurs by frictionally engaged curved surfaces;

in respect to the plane of two coupled floor panels, the tangent line at the first point of contact is steeper than the tangent line at the second point of contact.

According to preferred embodiments, one or more intermediate spaces may be provided at certain locations, as will be clear from the detailed description.

According to an important preferred feature, the panel of the invention is characterized in that the first joint profile and the second joint profile are configured such that when two panels are joined together, these fit together with a so-called pretension wherein the coupled panels are urged towards each other.

Preferably, said first joint profile and said second joint profile are cut profiles, resulting in that an easy manufacturing is possible, for example, by milling cutters that are positioned under appropriate angles in respect to the plane of the panels and/or by scrapers and/or any other tools.

The panels may consist of any suitable material, wherein the aforementioned coupling parts can be realized.

An important application of the invention is in floor panels. Preferably, the floor panels hereby comprise at least a core layer and a surface or decor layer. The surface or decor layer may in its turn comprise one or more material layers.

Preferably, the panels according to the invention comprise a wood-based core or wood-based core layer. The aforementioned joint profiles, due to the claimed features, are of an utmost appropriate configuration for the integration in wood-based panels, as the claimed configuration provides an optimum compromise between good joining features and a stable and reliable joint structure.

The invention is especially beneficial in panels that comprise a core which at least at one of said edges of the first joint profile or second joint profile, and preferably in its entirety, consists of wood fiber board, in particular MDF (Medium Density Fiberboard) or HDF (High Density Fiberboard). As is well known, such fiberboard is a very economical material for the production of covering panels, such as decorative floor panels, however, shows the disadvantage that it is relatively brittle. However, due to a structure as claimed in the present invention, adequate coupling allowing joining by a downward movement of one panel in respect to another can nevertheless be integrated in this material.

For a broad range of applications, use will be made of laminated panels. In the case of floor panels, this will be a laminated floor panel, such as DPL (Direct Pressure Laminate) or HPL (High Pressure Laminate).

It is clear that the invention can also be applied in other types of floor panels than laminated floor panels. A first important application is in so-called "engineered wood" panels, also called prefabricated parquet. A second important application is in PVC-based panels, more particularly floor panels, and still more particularly so-called LVT tiles (Luxurious Vinyl Tiles) or similar plastic tiles.

It is clear that still other materials can be applied in panels of the invention, as a core layer and/or as other parts of the panel. Some further examples of such materials are veneers, such as plywood, oriented strand board, cores made from particles (including discrete pieces of polymer or wood, which can be in the form of chips, curls, flakes, sawdust, shavings, silvers, stands, wafers, wood flour, wood wool and/or fibers), polymer (thermosetting and/or thermoplastic), flaxboard, stone (e.g., ceramic, marble, slate), cardboard, concrete, gypsum, high density fiber reinforced plaster, and other structural materials, such as metals (e.g., brass, aluminum, steel, copper, composites, composites or alloys), foamed material (either open cell or closed cell), such as polyurethane, a composite material from multiple materials (such as those listed above), either as a heterogeneous mass, multiple layers or defined sections, e.g., upper and lower veneers covering a core of particles, antistatic or antibacterial property materials, e.g., by the inclusion of silver flakes, powders or particles, carbon black, ceramics, organic compounds or other metals or alloys, plastic material including extrudable and/or moldable thermosetting and/or thermoplastic resins, the latter including high density olefins and polyvinylchloride.

BRIEF DESCRIPTION OF THE DRAWINGS

With the intention of better showing the characteristics of the invention, hereafter, as an example without any limitative character, a preferred embodiment of the invention is described, with reference to the accompanying drawings, wherein.

DETAILED DESCRIPTION

Figure 1:
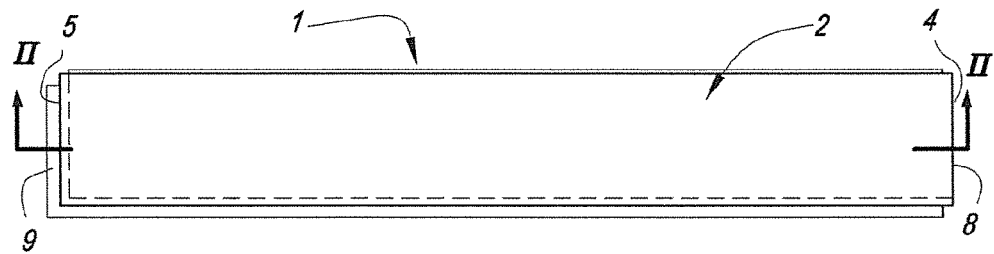
FIG. 1 represents in top plan view a panel, in this case a floor panel, according to the invention.
Figure 2:
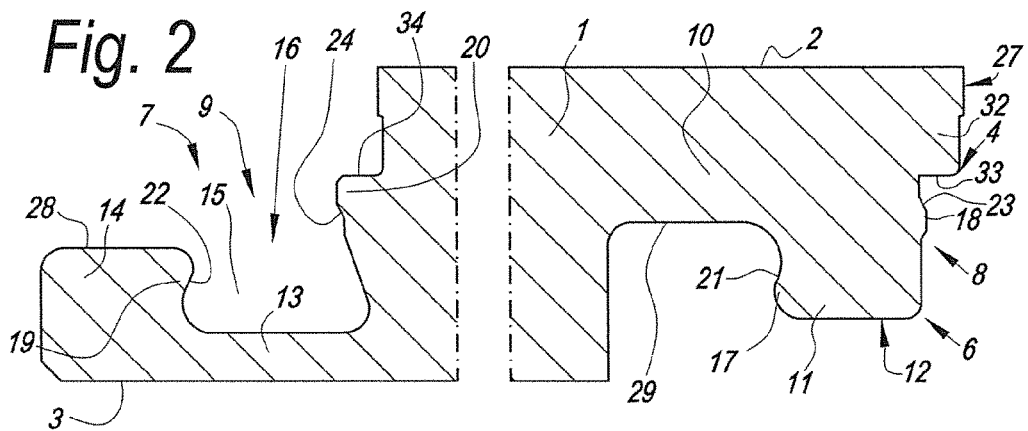
FIG. 2, at a larger scale, represents a cross-section according to line II-II in FIG. 1.

As represented in the drawings, the present invention relates to a panel 1 having an upper surface 2, a lower surface 3 and at least one pair of opposite edges 4-5;
  wherein said pair of edges 4-5 comprises a first edge 4 having a first joint profile 6 and a second edge 5 having a second joint profile 7;
  wherein said joint profiles 6-7 define coupling parts 8-9 allowing that two of such panels 1 can be joined or are joinable by a downward movement M of the edge of one panel 1 in respect to the edge of the other panel 1, wherein said coupling parts 8-9 in a coupled condition provide a locking in a direction R1 perpendicular to the plane of the coupled panels 1, as well as in a direction R2 parallel to the plane of the coupled panels 1 and perpendicular to the respective edges 4-5;
  wherein the first joint profile 6 comprises a first laterally projecting lip 10 with a downward projecting locking part 11, said downward projecting locking part 11 defining a male part 12;
  wherein the second joint profile 7 comprises a second laterally projecting lip 13 with an upward projecting locking part 14, said upward projecting locking part 14 defining proximally thereof a recess 15 acting as a female part 16;
  wherein the first laterally projecting lip 10 with the downward projecting locking part 11 defines a downward directed hook, whereas the second laterally projecting lip 13 with the upward projecting locking part 14 defines an upward directed hook;
  wherein, in the coupled condition of two of such panels 1, the downward directed hook and upward directed hook engage behind each other so as to prevent drifting apart of the panels 1;
  wherein said coupling parts 8-9 further comprise vertically active locking portions which at least define a first point of contact C1 and a second point of contact C2, said points of contact C1 and C2 being located at opposite sides of said male and female parts 12 and 16;
  wherein said vertically active locking portions comprise a first locking portion 17 and a second locking portion 18 at the respective opposite sides of said male part 12 and a third locking portion 19 and a fourth locking portion 20 at the respective opposite sides of the female part 16;
  wherein said first and third locking portions 17 and 19 in the coupled condition of two of such panels 1 define said first point of contact C1 and have contact surfaces 21-22 that in the coupled condition of two of such panels 1 define an inclined tangent line T1;
  wherein said second and fourth locking portions 18 and 20 in the coupled condition of two of such panels 1 define said second point of contact C2 and have contact surfaces 23-24 that in the coupled condition of two of such panels 1 define an inclined tangent line T2;
  wherein said male part 12 has a distal side 25 and a proximal side 26, said second locking portion 18 being located at the distal side 25;
  wherein the panel 1 at said first edge 4 has a distal edge 27 defining the closing plane of the panels, said second locking portion 18 being located in an inwardly offset position in regard to said distal edge 27, in other words, there is no portion of the panel protruding beyond the closing plane;
  wherein said joint profiles 6-7 are in one piece from the panel material; and
  wherein measured according to a direction perpendicular to the plane defined by the panels, the second point of contact C2 is closer to the plane defined by the upper surface 2 of the panels 1 than the first point of contact C1.

As explained in the introduction, the panel 1 is characterized in that it further comprises or shows one or more of the aforementioned four features. In the shown example, a combination of all four features is applied, namely:
  measured according to a direction perpendicular to the plane of two of such coupled panels 1 the distance D1 between the first point of contact C1 and the second point of contact C2 is larger than 0.10 times the overall thickness T of the panel 1;
  the second point of contact C2 is located higher than the upper edge 28 of said upward projecting locking part 14, by which is meant the uppermost point of the part 14;
  the distance D2 between the first and the second points of contact C1-C2 measured parallel to the plane of the panels 1 and perpendicular to the respective edges 4-5 is smaller than 4 times, and better smaller than 3 times the vertical distance D1 between the first and second points of contact C1-C2;
  the co-operation at the second point of contact C2 occurs by co-operating flat but inclined surfaces 23-24 at the respective locking portions, whereas the co-operation at the first point of contact C1 occurs by two co-operating surfaces 21-22 of which at least one of them is and preferably both of them are curved.

It should be noted that in the present specification, the term "point of contact", seen in a cross-section, can relate both to a local point contact as well as to a contact extending over a certain area. In cases where a distance D1 or D2 is to be defined by such "point of contact", in particular C1 and C2, such distance needs to be measured from the local point or, in case of a contact extending over a certain area, from the center of this area.

As represented, it is preferred that measured according to the direction perpendicular to the plane of two of such coupled panels 1 the distance D1 between the first point of contact C1 and the second point of contact C2 is even larger than 0.15 times the overall thickness T of such panel 1.

From the drawings, it is also clear that the shown embodiment has the following features, which in this embodiment are combined, but, of course, according to not shown variants, not necessarily need to be combined:

that the lowermost contact at the second point of contact C2 is located higher than the uppermost contact at the first point of contact C1; hereby, by the lowermost contact has to be understood the lowermost extremity of the contact area formed by the second point of contact C2, whereas by the uppermost contact has to be understood the uppermost extremity of the contact area formed by the first point of contact C1;

that the lowermost contact at the second point of contact C2 is located higher than the uppermost contact at the first point of contact C1 over a distance of at least 0.10 and still better at least 0.15 times the overall thickness T of the panel 1;

that the second point of contact C2 is located higher than the level that generally is defined by the lower side 29 of said first laterally projecting lip 10, wherein this relates to the lower side 29 that is located adjacent to the downward projecting locking part 11.

Figure 5:
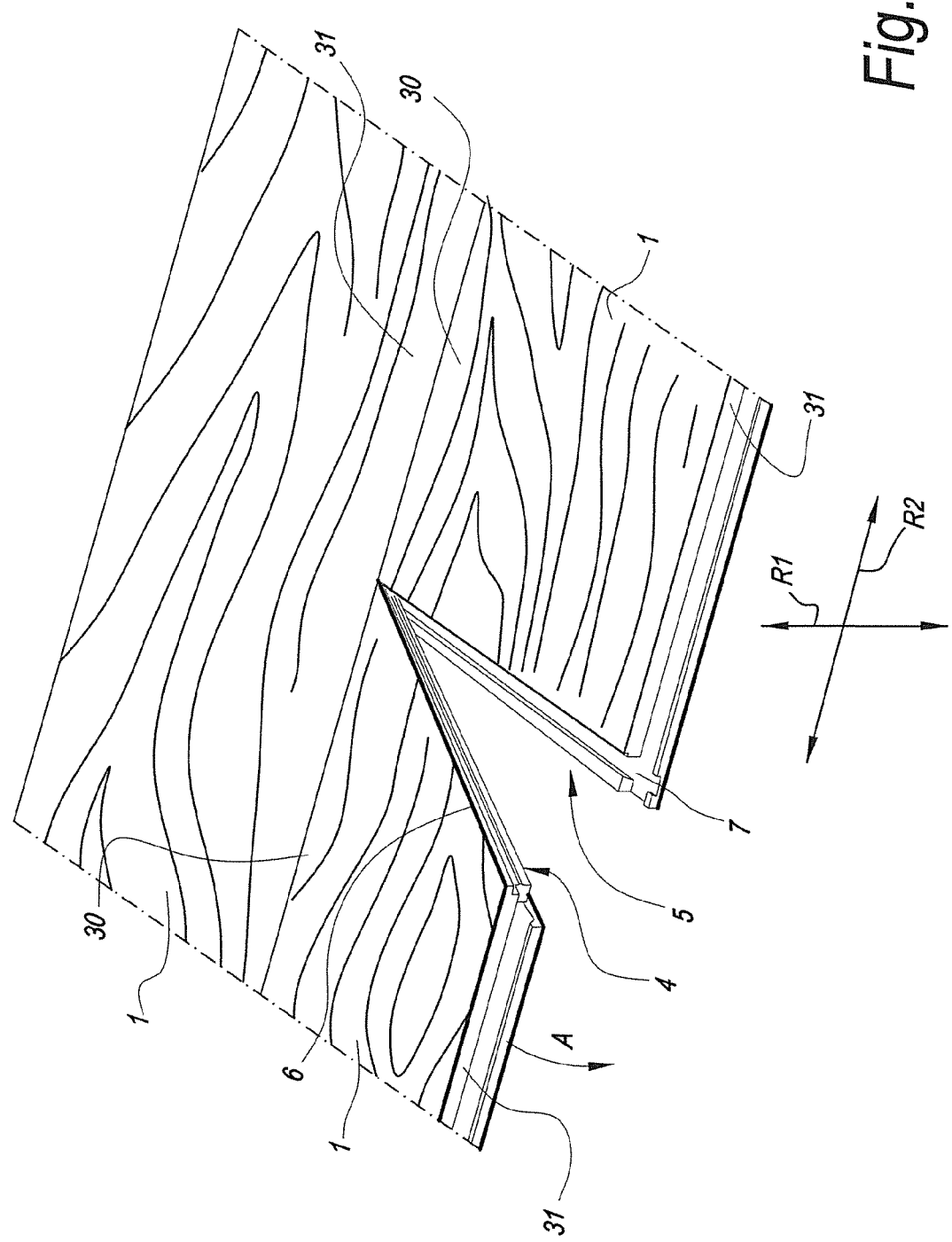
FIG. 5 schematically represents a plurality of the panels of FIGS. 1 to 4, during the coupling thereof.

Further, as indicated in FIGS. 1 and 5, such panel 1 is preferably characterized in that it has a first pair of opposite edges 30-31 and a second pair of opposite edges formed by the previously mentioned edges 4-5, said first and second joint profiles 6-7 thus being provided at the second pair of opposite edges 4-5; in that the panel 1 at the first pair of opposite edges 30-31 comprises coupling parts that in the coupled condition of two of such panels provide a locking in a direction perpendicular to the plane of the coupled panels, as well as in a direction parallel to the plane of the coupled panels and perpendicular to the respective edges; and in that said coupling parts at the first pair of edges are configured such that they allow that two of such panels can be joined, or are joinable, by an angling movement A of one panel in respect to the other, thereby allowing the joining of a plurality of such panels 1 by the so-called fold-down technique. Examples of coupling parts which allow joining by an angling movement A are as such well-known from the state of the art, especially from existing fold-down systems, and therefore are not shown or described in detail. For an example, reference is made to FIGS. 25 and 26 of WO 2009/066153.

The embodiment of the invention represented in the drawings also demonstrates the feature that, seen in cross-section, said first joint profile comprises only one vertically active locking portion at each side 25-26 of said male part 12.

As shown in the represented embodiment, the panel 1 preferably is also characterized in that said first joint profile 6 above the second locking portion 18 comprises a laterally protruding lip 32, said lip 32 comprising at its lower side a downward facing support surface 33, that in coupled condition is intended to co-operate with an upward directed support surface 34 at the second joint profile of a coupled panel 1, thereby forming a third point of contact C3. According to a further preferred feature, the panel 1 will hereby also be characterized in that in the coupled condition there are only four points of contact between the first joint profile and the second joint profile, namely the aforementioned first, second and third points of contact C1-C2-C3 and a fourth point of contact C4 at the distal end of said laterally protruding lip 32.

According to the invention, it is preferred that the downward projecting locking part of the first joint profile is a solid part, or at least is solid in between the first and second points of contact C1 and C2. In other words, in a straight line between both points of contact C1 and C2 no gaps, slots or the like are present.

Figure 4:
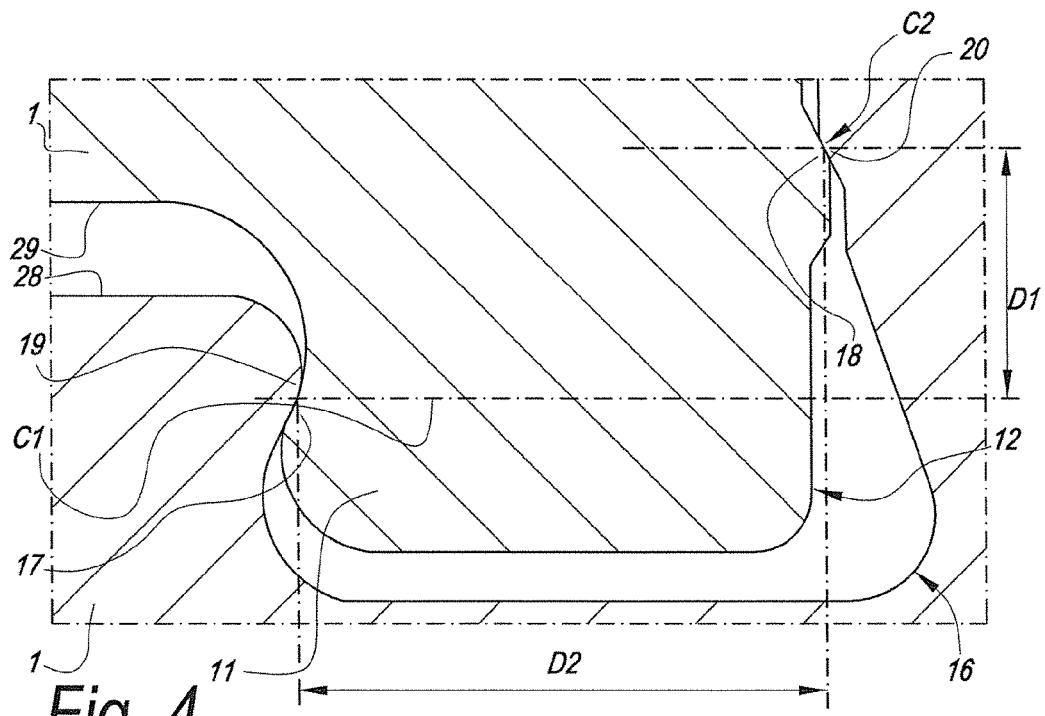
FIG. 4, at a larger scale, represents the portion indicated by F4 in FIG. 3.

It is clear that in the represented embodiment, also the following features are applied:

the cooperation at the second point of contact C2 occurs by cooperating flat but inclined surfaces 23-24 at the respective locking portions;

the cooperation at the first point of contact C1 occurs by two cooperating surfaces 21-22 of which at least one of them is and, as shown, preferably both of them are curved;

the cooperation at the first point of contact C1 occurs by frictionally engaged curved surfaces, as clearly visible in the enlargement of FIG. 4.

In a preferred embodiment and in respect to the plane of the two coupled floor panels 1, the tangent line T1 at the first point of contact C1 will be steeper than the tangent line T2 at the second point of contact C2.

Further, it is noted that the horizontal overlap, by which the first locking part 17 grips behind the third locking part 19, preferably is in the range of 0.05 to 0.3 mm, and still better in the order of magnitude of 0.1 mm. Other values are, however, not excluded.

Further, as also illustrated in the figures, one or more intermediate spaces may be provided. In the represented embodiment, intermediate spaces are applied at the following locations:

at least underneath the male part 12, such that there is no support between the distal lower end of the male part and the upper side of the second laterally projecting lip;

at least above the upward projecting locking part, such that there is no support between the distal upper end of the upward projecting locking part and the lower side of the first laterally projecting lip.

In the foregoing description, several times reference is made to vertical and horizontal directions, as well as to upper and lower sides and upward and downward directed parts, etc. It is clear that this should be seen in relation to panels which are in a flat position with the front side or decorative side facing upwards, as in floor panels. This, however, does not exclude that it may relate to panels that normally will be used in other positions, such as wall panels and ceiling panels, wherein said orientations then need to be interpreted as if the panel were put down with the decorative side facing upward.

Figure 3:
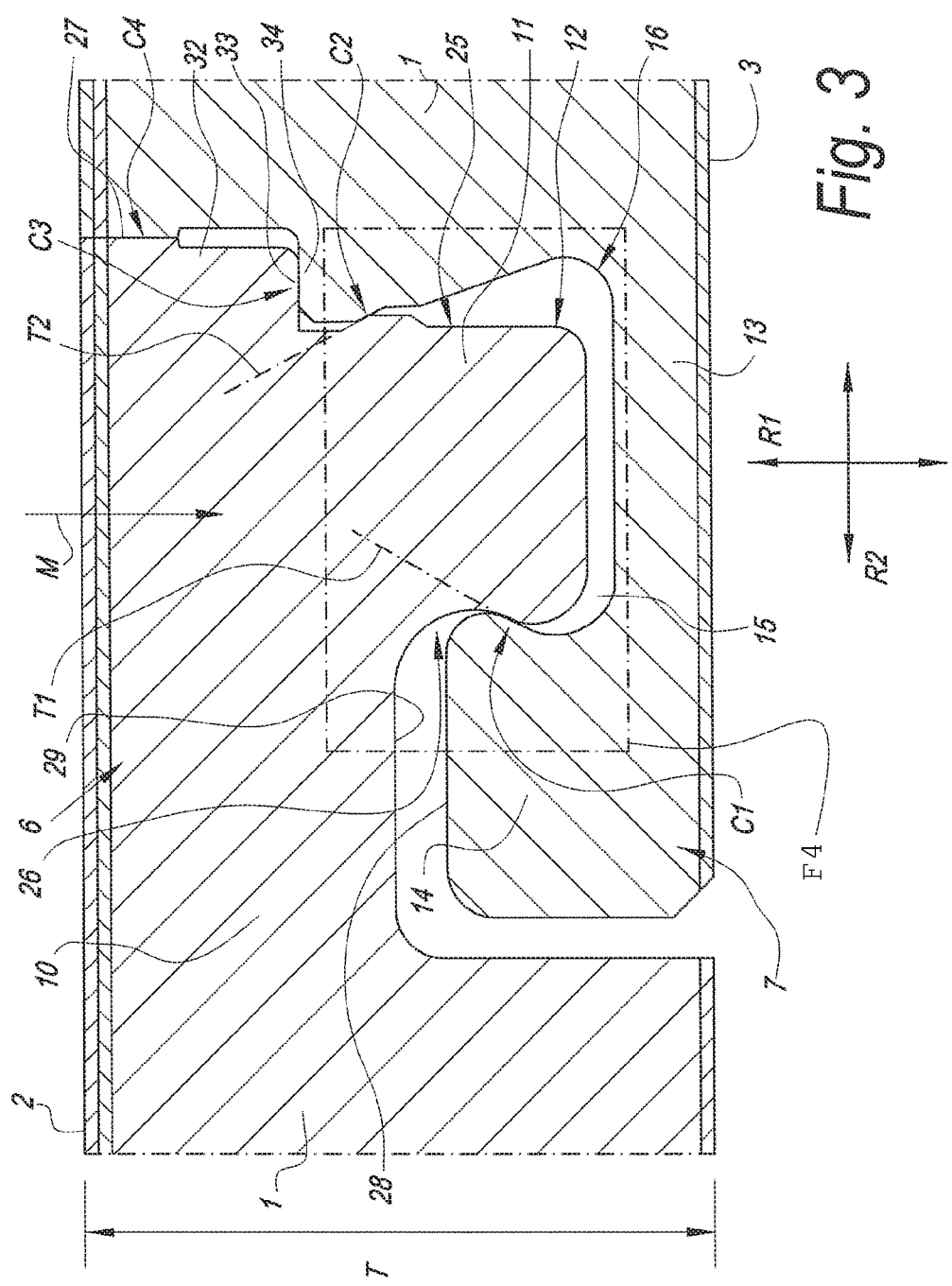
FIG. 3 in cross-section represents the edges of two of such panels in coupled condition.

It is noted that in FIG. 3 a top layer, comprising two layers, for example a decor layer and an overlay, and backing layer are represented. It is clear that this is only by way of example. Other compositions are possible.

It is clear that in the case of elongated panels, the aforementioned coupling parts 8-9, that provide in a so-called push-lock coupling, preferably will be applied at the short edges.

The present invention is in no way limited to the embodiment described by way of example and represented in the figures. On the contrary, such panels may be realized according to various alternatives, without leaving the scope of the invention. Amongst others, all different characteristics described with reference to the embodiment in the drawings can be applied separately or in any combined manner.

The invention claimed is:

1. A panel, having:
   an upper surface, a lower surface and at least one pair of opposite edges;
   wherein said at least one pair of opposite edges comprises a first edge having a first joint profile and a second edge having a second joint profile;
   wherein said first and second joint profiles define coupling parts allowing that two of such panels forming a first panel and a second panel are joinable by a downward movement of the first edge of the first panel in respect to the second edge of the second panel, wherein said coupling parts in a coupled condition provide a locking in a direction perpendicular to a plane of the first panel and second panel in a coupled condition, as well as in a direction parallel to the plane of the coupled panels and perpendicular to said first and second edges;
   wherein the first joint profile comprises a first laterally projecting lip with a downward projecting locking part, said downward projecting locking part defining a male part;
   wherein the second joint profile comprises a second laterally projecting lip with an upward projecting locking part, said upward projecting locking part defining proximally thereof a recess acting as a female part;
   wherein the first laterally projecting lip with the downward projecting locking part defines a downward directed hook, whereas the second laterally projecting lip with the upward projecting locking part defines an upward directed hook;
   wherein, in the coupled condition of the first and second panels, the downward directed hook and upward directed hook engage behind each other so as to prevent drifting apart of the first and second panels;
   wherein said coupling parts further comprise vertically active locking portions which at least define a first point of contact and a second point of contact, said first and second points of contact being located at opposite sides of said male and female parts;
   wherein said vertically active locking portions comprise a first locking portion and a second locking portion at respective opposite sides of said male part and a third locking portion and a fourth locking portion at respective opposite sides of the female part, said first and third locking portions and said second and fourth locking portions counteracting vertical separation of said first and second panels in coupled condition;
   wherein said first and third locking portions in the first and second panels in coupled condition define said first point of contact and have a contact surface of the first locking portion and a contact surface of the third locking portion that in the coupled condition of the first and second panels define an inclined tangent line, the contact surface of the first locking portion facing upward in an inclined manner and the contact surface of the third locking portion facing downward in an inclined manner;
   wherein said second and fourth locking portions in the first and second panels in coupled condition define said second point of contact and have a contact surface of the second locking portion and a contact surface of the fourth locking portion that in the coupled condition of two of such panels define an inclined tangent line, the contact surface of the second locking portion facing upward in an inclined manner and the contact of the fourth locking portion facing downward in an inclined manner;
   wherein said male part has a distal side and a proximal side, said second locking portion being located at the distal side;
   wherein the panel at said first edge has a distal edge defining a closing plane of the panels, said second locking portion being located in an inwardly offset position in regard to said distal edge;
   wherein said first and second joint profiles are in one piece from a panel material;
   wherein measured according to a direction perpendicular to the plane defined by said first and said second panels, the second point of contact is closer to the plane defined by the upper surface of the panels than the first point of contact;
   wherein the contact surfaces of said second point of contact are located completely above a level defined by the upper edge of said upward projecting locking part; and
   wherein the panel has a first pair of opposite edges and a second pair of opposite edges, said first and second joint profiles being provided at the second pair of opposite edges, wherein the panel at the first pair of opposite edges comprises coupling parts that in the coupled condition of two of such panels provide a locking at respective edges in a direction perpendicular to the plane of the coupled panels, as well as in a direction parallel to the plane of the coupled panels and perpendicular to the respective edges, and wherein said coupling parts at the first pair of edges are configured such that respective panels are joinable by an angling motion of one panel in respect to another panel, the first joining profile and the second joining profile of the second pair of opposite edges being configured such that joining of two such panels at said second pair of edges can take place at a same time and concurrently with the angling motion at the first pair of opposite edges.

2. The panel of claim 1, wherein measured according to a direction perpendicular to the plane of the first and second panels a distance between a first point of contact and a second point of contact is larger than 0.15 times the overall thickness of the panel.

3. The panel of claim 1, wherein the second point of contact is located higher than a level defined by a lower side of said first laterally projecting lip.

4. The panel of claim 1, wherein, seen in cross section, said first joint profile comprises only one vertically active locking portion at each side of said male part.

5. The panel of claim 1, wherein the downward projecting locking part of the first joint profile is a solid part, at least in between the first and second contact points.

6. The panel of claim 1, wherein said vertically active locking portions are configured such that one or more of the following features are obtained:

the cooperation at the second point of contact occurs by cooperating flat but inclined surfaces at the respective locking portions;

the cooperation at the first point of contact occurs by two cooperating contact surfaces of which at least one of the two cooperating contact surfaces is curved;

the cooperation at the first point of contact occurs by frictionally engaged curved surfaces;

in respect to the plane of the first and second coupled floor panels, the tangent line at the first point of contact is steeper than the tangent line at the second point of contact.

7. The panel of claim 1, wherein intermediate spaces are provided at one or both of the following locations:

at least underneath the male part, such that there is no support between a distal lower end of the male part and the upper side of the second laterally projecting lip;

at least above the upward projecting locking part, such that there is no support between a distal upper end of the upward projecting locking part and the lower side of the first laterally projecting lip.

8. The panel of claim 1, wherein the first joint profile and the second joint profile are configured such that when two panels are joined together the two panels fit together with a pretension wherein the coupled panels are urged towards each other.

9. The panel of claim 1, wherein said first joint profile and said second joint profile are cut profiles.

10. The panel of claim 1, wherein the panel comprises a core, the core consists of wood fiber board, MDF or HDF at least at one of said edges of the first joint profile, second joint profile, or an entirety thereof.

11. The panel of claim 1, wherein the panel is a laminated floor panel, such as DPL or HPL, or an engineered wood panel.

12. The panel of claim 1, wherein said second laterally projecting lip has a distal end, said distal end being free from vertically active locking elements.

13. The panel of claim 1, wherein a lowermost contact at the second point of contact is located higher than an uppermost contact at the first point of contact.

14. The panel of claim 13, wherein the lowermost contact at the second point of contact is located higher than the uppermost contact at the first point of contact over a distance of one of (a) at least 0.10 times the overall thickness of the panel and (b) at least 0.15 times the overall thickness of the panel.

15. The panel of claim 1, wherein said first joint profile above the second locking portion comprises a laterally protruding lip, said laterally protruding lip comprising at a lower side a downward facing support surface, that in coupled condition is intended to co-operate with an upward directed support surface at the second joint profile of a coupled panel, thereby forming a third contact point.

16. The panel of claim 15, wherein in the coupled condition there are only four points of contact between the first joint profile and the second joint profile, namely the aforementioned first, second and third points of contact and a fourth point of contact at the distal end of said laterally protruding lip.

17. The panel of claim 1, said panel being a floor panel.

18. The panel of claim 17, said panel comprising a wood based core.

19. The panel of claim 17, said panel comprising a PVC-based panel or a LVT tile.

\* \* \* \* \*